(12) United States Patent
Vichinsky et al.

(10) Patent No.: US 8,015,958 B2
(45) Date of Patent: Sep. 13, 2011

(54) ACTIVE INTAKE MANIFOLD FLAP CARTRIDGE AND METHOD

(75) Inventors: Kevin Vichinsky, Portage, MI (US); Rick Weckerle, Kalamazoo, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 361 days.

(21) Appl. No.: 12/360,870

(22) Filed: Jan. 28, 2009

(65) Prior Publication Data
US 2010/0186705 A1 Jul. 29, 2010

(51) Int. Cl.
*F02M 35/10* (2006.01)
(52) U.S. Cl. ............... 123/184.55; 123/336; 123/337; 251/305
(58) Field of Classification Search ............. 123/184.56, 123/184.53, 184.52, 184.47, 184.51, 184.24, 123/184.61, 184.55, 319–337; 251/304, 251/305, 314
See application file for complete search history.

(56) References Cited

U.S. PATENT DOCUMENTS

| | | | | |
|---|---|---|---|---|
| 2,230,740 A | * | 2/1941 | Birkigt | ............... 123/308 |
| 5,009,200 A | * | 4/1991 | van Basshuysen et al. | ............... 123/184.52 |
| 6,763,802 B1 | * | 7/2004 | Brassell | ............... 123/336 |
| 7,162,997 B2 | * | 1/2007 | Madeira | ............... 123/336 |
| 7,281,512 B2 | | 10/2007 | Marentette | |
| 7,314,032 B2 | * | 1/2008 | Nakayama | ............... 123/184.55 |
| 2002/0088423 A1 | | 7/2002 | Minegishi et al. | |

FOREIGN PATENT DOCUMENTS

EP 1135584 9/2001

* cited by examiner

*Primary Examiner* — Michael Cuff
*Assistant Examiner* — Hung Q Nguyen
(74) *Attorney, Agent, or Firm* — James Hasselbeck

(57) ABSTRACT

An active intake manifold system includes at least one flap cartridge assembly having a unitary cartridge housing including one or more flap valve housings. A flap valve is rotatable in the aperture of the flap valve housing between an open state and a closed state. A shaft is provided extending through the mounting ear apertures of the flap valves so that the flap valves change state in unison. A plurality of air intake runners provides air flow communication between the outlets of the flap valve housings and the cylinder intake valves of the engine. Each intake runner includes a main runner portion that then splits into a plurality of tracts of differing lengths with each tract tuned to a different predetermined engine speed and having a length and volume selected to optimize engine performance at the predetermined speed. The flap valves may be automatically operated by an actuator under control of an engine control system.

13 Claims, 4 Drawing Sheets

ACTIVE INTAKE MANIFOLD FLAP CARTRIDGE AND METHOD

TECHNICAL FIELD

The present invention relates to an air intake manifold for internal combustion engines and, more particularly, to active air intake manifold systems.

BACKGROUND OF THE INVENTION

The main function of an intake manifold is to distribute clean air—as far as possible, without pressure loss—from the air filter into the combustion chamber of the engine. As well as the throttle body, further components such as an air mass meter, sensors, EGR ducts, fuel rail and injection valves may be integrated into the complete air intake system.

A typical intake manifold may be mounted to a cylinder head of an engine includes a plenum and may include a one runner for each engine cylinder that distributes air flow from the manifold to the intake ports of each cylinder. For a given air intake manifold, engine performance (e.g., the location of the engine's torque peak in the RPM band) is a function of the volume of the plenum, the cross-sectional area of the runners and, to a lesser extent, the length of the runners.

Conventional intake manifolds employed on engines generally have fixed runner geometry. With a fixed intake system, the speed at which intake tuning occurs is also fixed. Since the engine operates over a broad RPM range, and since a different geometry may be ideal for different engine speeds, fixed geometry intake systems are designed with a geometry which is only optimal for a limited engine speed range, thus the engineer is forced to design a compromise between torque at low speeds and horsepower at high engine speeds.

In a tuned manifold, for example, the plenum volume, the length of the runners and the cross-sectional area of the runners may be selected so that a pressure wave formed within the runners has a resonant frequency that optimizes (or elevates) the intake pressure at each intake port when the corresponding intake valve opens, providing increased mass air flow to the cylinder.

One variable used to select the size and dimension of both the plenum and the runners is the engine size (i.e. the engine displacement). The total volume of an air intake manifold, which includes the volume of the plenum and the volume within the runners, is typically about twice the total engine displacement.

The performance and torque of internal combustion engines are significantly improved through the development of variable air intake manifolds which can switch between different runner lengths. A short runner optimizes performance at higher speeds, while a long runner provides favorable torque in the lower and medium speed ranges.

An active air intake manifold optimizes incoming airflow through a valve provided in the intake manifold. The valve controls flow to the intake tracts that correspond to desired engine-performance parameters. At low engine rotational speeds (RPMs), the valve creates a longer path for intake air, enhancing combustion efficiency and torque output. At higher engine rotational speeds, the valve opens, creating a shorter path for maximum engine power.

Active air intakes are particularly useful in adapting the intake manifold to significantly increase low speed engine torque, giving the engine a broader torque curve that retains higher specific torque output across the engine speed range.

Some intake system designs have been created to allow for variable intake geometry and have met with varying degrees of success. With these designs, the cost may be excessive for certain applications due to complex and costly design, either in fabrication or assembly. An example of a suitable but relatively more costly solution is disclosed in European Patent publication EP1135584.

Other lower cost designs may utilize slide valves or air flaps. Either type is typically driven by a vacuum actuator or an electric motor, usually under the control of an Engine Control Unit (ECU) computer. Designs of this type close and open only the short runner, closing the short runner at low speeds to improve engine low speed torque.

SUMMARY OF THE INVENTION

In one aspect of the invention, an active intake manifold system includes at least one flap cartridge assembly having a unitary (one piece formed) cartridge housing. The unitary cartridge housing includes one or more flap valve housings, each having an airflow aperture therethrough connecting a housing inlet and outlet. A flap valve is provided within and rotatable within the aperture of the flap valve housing. Each flap valve includes at least one mounting ear having an aperture therethrough. The mounting ears are secured to the flap valve. The flap valve in the flap valve housing is rotatable between an open state and a closed state, wherein when in the closed state the flap valve substantially prevents airflow through the flap valve housing aperture. The flap valves of a single flap cartridge assembly share a common axis of rotation. A shaft is provided extending through the mounting ear apertures of the flap valves to rotatably operate the flap valves. The mounting ears rotationally lock the flap valves to the shaft so the flap valves change state in unison. A plurality of air intake runners are provided to provide air flow communication between the outlets of the flap valve housings and the cylinder intake valves of the engine. Each intake runner includes a main runner portion that divides into a plurality of tracts of differing lengths with each tract tuned to a different predetermined engine speed and having a length and volume selected to optimize engine performance at the predetermined speed. Each tract is in air flow communication with a different flap valve housing outlet so that it may be individually controlled. For any intake runner only one associated flap valve at a time is in the open state, which is to say that only one tract of the air intake runner is in air flow communication between the flap cartridge assembly/air intake duct and the engine cylinder intake valve or valves. The flap valves, through the rotary shaft, may be automatically operated by an actuator which may be under the control of an engine management system.

In another aspect of the invention, the inlets of the flap valve housings are secured to and in air flow communication with an air intake duct.

In another aspect of the invention, the flap valve housings of each unitary cartridge housing are arranged linearly side by side in alignment with the flap valve axis of rotation.

In another aspect of the invention, when a portion of said flap valves on the shaft are in the closed state, a different portion of the flap valves are in the open state.

In another aspect of the invention, each tract of the intake runner is connected to a different flap cartridge assembly. The flap valves in the flap cartridge assemblies are synchronized such that for any given intake runner only one tract has a flap valve in the open state at a time.

In another aspect of the invention, synchronization between different flap cartridge assemblies is provided by a mechanical linkage connecting the shafts of the flap cartridge assemblies such that the shafts rotate in unison.

In another aspect of the invention, the plurality of tracts to a particular engine cylinder intake include a long tract and a short tract.

In another aspect of the invention, at least one bearing cartridge is sized and configured to be inserted into bearing receptacles provided in the unitary cartridge housing. The bearing cartridge includes a bearing aperture sized and configured to permit the shaft to supportively pass through and rotate in the bearing, thereby rotatably supporting the flap valves in the flap valve housings.

In another aspect of the invention, the bearing cartridge includes an elastomeric material which resiliently contacts the bearing receptacle walls thereby preventing air leakage around the bearing cartridge.

In another aspect of the invention, the bearing receptacles are arch-shaped and the bearing cartridges are shaped and configured to be received into the arch-shaped bearing receptacles.

In another aspect of the invention, each of the tracts is ultrasonic welded to a different one of the flap valve housing.

In another aspect of the invention, the flap valves of each flap valve cartridge assembly are configured to be positioned in alternating open-closed states along the common axis of shaft rotation.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

An improved active intake manifold flap cartridge system is disclosed. A method of assembling a flap cartridge system is also disclosed. The active intake manifold flap cartridge system of the present invention is adapted to effectively switch intake air flow between intake tracts of varying lengths while blocking off the unused tracts while further providing a system that is low in cost. The invention is particularly useful in automotive and commercial vehicle applications where an active manifold is desirable to optimize engine performance at higher speeds, while providing favorable torque in the lower and medium speed ranges.

The invention differs from the prior art by providing a low cost active manifold system without resorting to the use of more costly and complex designs such as barrel valves and complex rotary tract length tuning systems.

The invention further differs from the prior art by providing a low cost switchable dual flap valve cartridge assembly that effectively switches between the longer and shorter intake tracts of an air intake runner while closing off the unused intake tract or tracts. Prior art designs provide valve assemblies utilizing a barrel valve or single flap that does not close off the long intake runner when the short runner is activated. From an intake runner tuning and engine performance standpoint, it is desirable to close off, for example, the long intake runner when the short runner is active. This is an object of the present invention.

The present invention includes innovative insertable elastomeric bearing cartridges that support the shaft and flap valves while effectively preventing leakage between neighboring runners around the bearing cartridges.

Figure 1:
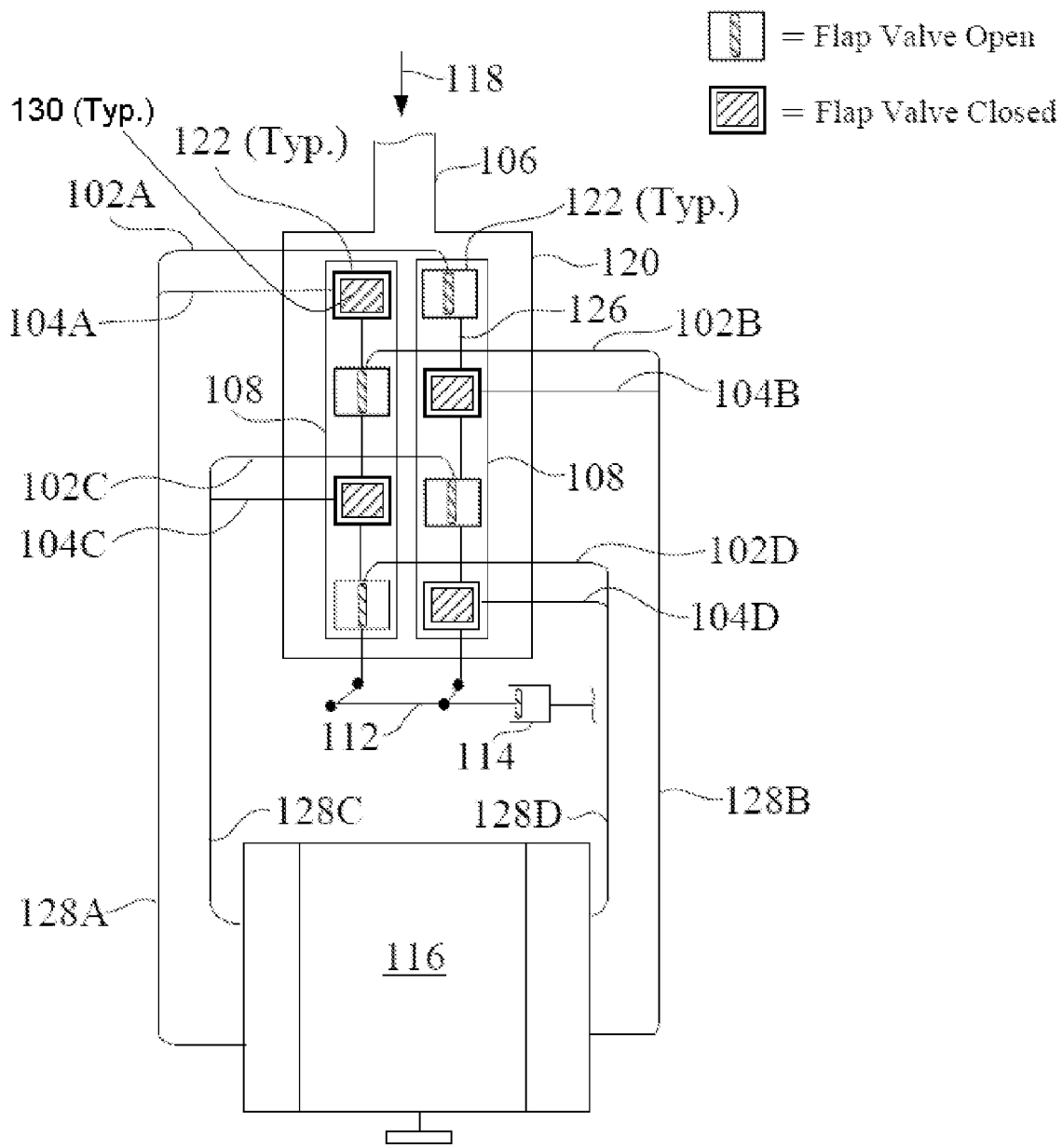
FIG. 1 presents a schematic diagram of an active intake manifold interfaced to an internal combustion engine, consistent with the present invention.

FIG. 1 presents a schematic diagram of an active intake manifold interfaced to an internal combustion engine, consistent with the present invention. In FIG. 1, intake air 118 is provided through an air intake duct 106 to a distribution chamber 120. Intake air 118 is typically filtered upstream by an air filter/air cleaner assembly (not shown). Distribution chamber 120 may be a separate member to which the air intake duct 106 is in air flow communication, or alternately the distribution chamber 120 may be realized as a portion of the air intake duct 106.

One or more flap cartridge assemblies 108 may be provided on the distribution chamber. Each cartridge assembly 108 includes at least one flap valve housing 122 including a rotationally actuated flap valve 130 rotatably actuated by a shaft 126. In exemplary embodiments of the invention, the shaft 126 may extend through a plurality of adjacent flap valve housings 122 that make up the flap cartridge assembly 108. The shaft 126 synchronizes the actuation of a plurality of flap valves 130 in the flap cartridge assembly 108.

In an exemplary embodiment schematically illustrated in FIG. 1, two flap cartridge assemblies 108 are illustrated, each having four synchronized sets of flap valves 130 provided in a unitary cartridge housing 240 (see FIG. 2). To illustrate the inventive concept in the drawing, a specific configuration for the illustration was chosen. It is to be understood that the present invention is not limited to flap cartridge assemblies having four synchronized flap valves 130, but instead any number of flap valves 130 may be included in a single flap cartridge assembly 108.

A plurality of air intake runners 128A-D extends between the flap cartridge assemblies 108 and the cylinder heads (not shown) of internal combustion engine 116. Typically each runner is designed to supply filtered intake air to a designated cylinder (not shown) through the engine cylinder head intake valve or valves (not shown). In the illustrated specific embodiment of the present invention, each runner 128A-D bifurcates into corresponding long tract 102A-D and short tract 104A-D portions. It is to be understood that, in general, air intake runners may split in any number of differing length tracts without deviating from the present invention.

As discussed earlier, the air intake runners 128A-D together with the flap valves 130 are configured to optimize engine performance. Depending typically on engine speed, the flap valves 130 direct intake airflow to either the long intake tract 102A-D or alternately the short intake tract 104A-D. At low engine rotational speeds (RPMs), the long tract 102A-D is utilized to enhance combustion efficiency and torque output. At higher engine rotational speeds the short tract 104A-D is utilized to create a shorter path with a higher resonant air wavefront frequency for maximum engine power.

The flap valves 130 are synchronized such that, for each air intake runner 128A-D, only one of the corresponding short tract 104A-D or long tract 102A-D is open for air flow at a given time. For example, runner 128A has a short tract 104A and a long tract 102A. FIG. 1 illustrates flap valve 130 at long tract 102A in the open position (see Legend) while the short tract 104A flap valve 130 is illustrated in the closed position (see Legend). Similarly, the flap valves 130 are synchronized such that all runners 128A-D switch between the short tract 104A-D and the long tract 102A-D simultaneously, as is illustrated in FIG. 1.

A shaft 126 extends through the flap valves 130 of the flap valve assembly 108 and synchronizes operation of all flap valves 130 of the assembly. Where a portion of the flap valves 130 are provided on additional flap cartridge assemblies (ex: two assemblies 108 illustrated in FIG. 1, corresponding to two tracts per engine cylinder of the illustrated embodiment), the shafts 126 may be synchronized by a mechanical linkage 112 interconnecting the shafts 126 of the flap cartridge assemblies 108. The flap valves 130 may be actuated by a actuator 114 which may be a vacuum actuator (as illustrated), an electric motor, solenoid actuator or other types of actuators as would be known to those skilled in the art.

Figure 2A:
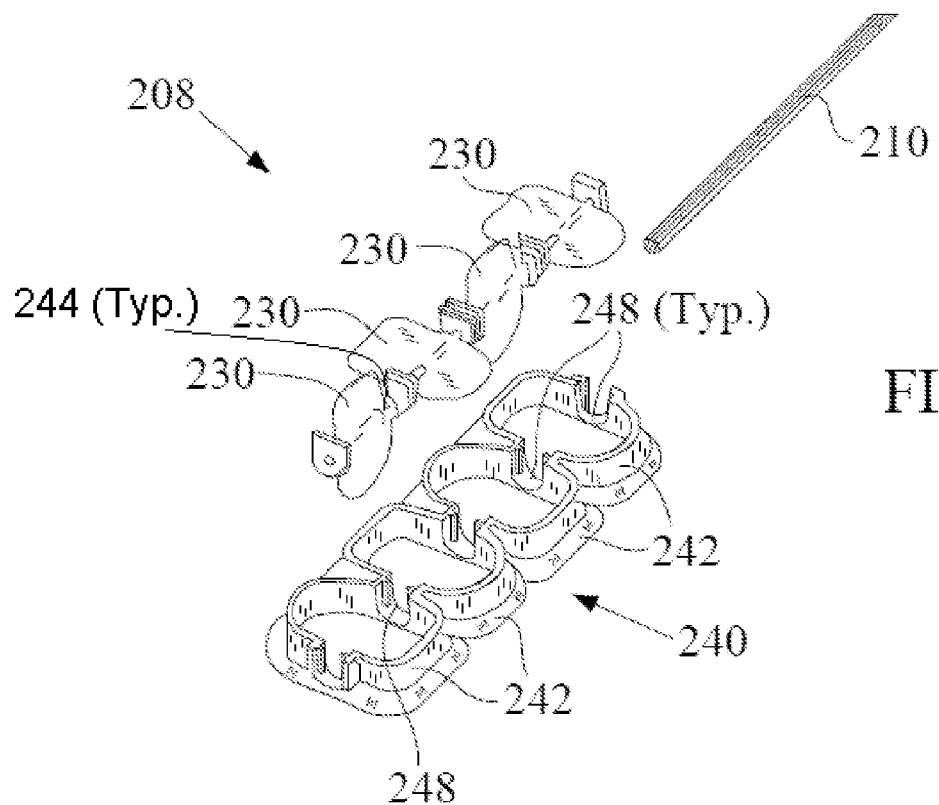
FIG. 2A is an exploded view of an exemplary embodiment of a flap cartridge assembly, consistent with the present invention.
Figure 2B:
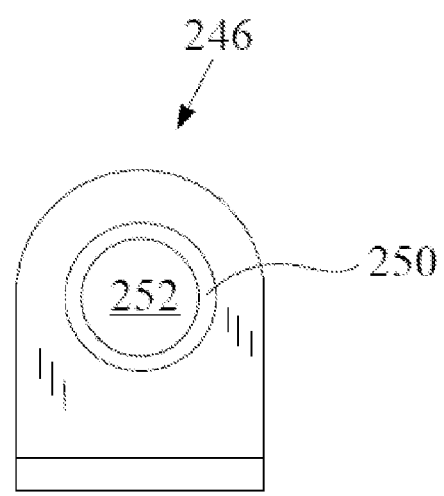
FIG. 2B depicts an exemplary embodiment of a bearing assembly for the flap cartridge assembly of FIG. 2A, consistent with the present invention.

FIG. 2A is an exploded view of an exemplary embodiment of a flap cartridge assembly 208, consistent with the present invention. FIG. 2B depicts an exemplary embodiment of a bearing cartridge 246 for the flap cartridge assembly 208 of FIG. 2A, consistent with the present invention. Flap cartridge assembly 208 is one illustratory exemplary embodiment of the flap cartridge assembly 108 discussed with FIG. 1. Other aspects of the invention may differ in the number of flap valves 230, the flap valve housing 242 shape as well as the general arrangement of flap valve housings 242 in the flap cartridge assembly 208. The assembly view of flap cartridge 208 illustrates several features of the invention. As will be discussed and shown in further detail with other Figures, the flap cartridge assembly includes a unitary cartridge housing 240 integrating a plurality of flap valve housings 242. The unitary cartridge housing 240 may be provided from a moldable plastic material and formed in one piece using a technology such as injection molding. As illustrated in FIG. 2A, the flap valves 230 each include one or more mounting ears 244 having an aperture therethrough, the mounting ears configured to mount the flap valves 230 to the shaft 210. Bearing cartridges 246 are configured and adapted to be received into arch shaped bearing receptacles 248 provided in the cartridge housing 240. In an exemplary embodiment the bearing cartridges 246 are made of an elastomeric material with a plastic or metallic bearing 250 secured to the bearing cartridge 246, and have an aperture 252 sized and configured to receive, support and provide an air flow seal around the shaft 210. The elastomer based bearing cartridge 246 advantageously prevents the shaft 210 from binding as the elastomeric bearing cartridge 246 is able to flex to compensate for tolerance and alignment issues and its elastomeric properties additionally provide a seal between the flap valve housings 242 and the bearing cartridge 246. The mounting ears 244 may be secured to the shaft 210 by any means know to those skilled in the art including laser welding, gluing, etc. such that the flap valves 230 are configured to rotate in lock step with the shaft 210.

The flap cartridge assembly 208 may be assembled as follows. First the bearing cartridges 246 are positioned into the bearing receptacles 248 of the cartridge housing 240. The flap valves 230 are then set into the cartridge housing 240 and the shaft 210 is then inserted through the bearings 250 and the mounting ears 244 of the flap valves 230. The mounting ears may be locked to the shaft using any method including press fit design of the ear apertures on the shaft, gluing or laser welding the mounting ears onto the shaft, or any other method as would be known to one skilled in the art. The assembled flap cartridge assembly 208 may then be secured to the air intake manifold 106 or distribution chamber 120 (see schematic illustration FIG. 1) using any known technique including vibration welding, ultrasonic welding, adhesives or other techniques as known to one skilled in the art such that inlets of the flap valve housings 122 are in air flow communication with the air intake duct 106.

Figure 3A:
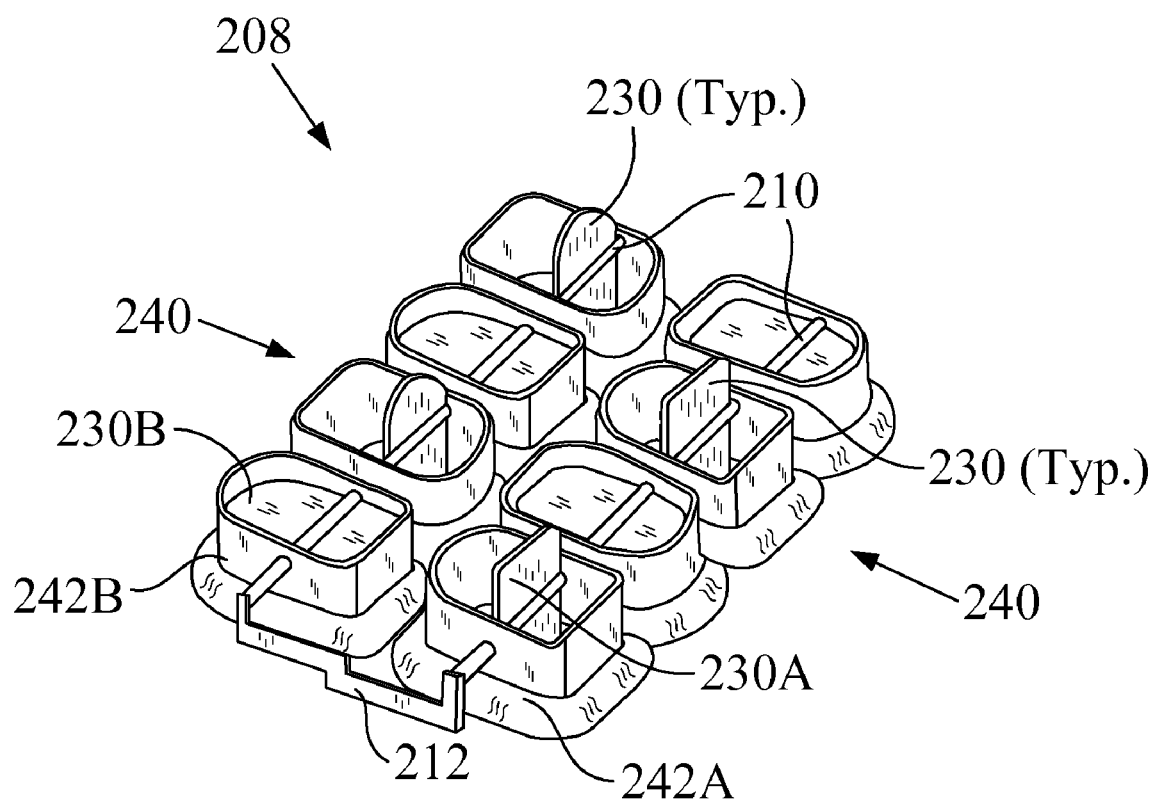
FIG. 3A is a perspective view of two exemplary fully assembled flap cartridge assemblies previously shown as exploded components in FIGS. 2A and 2B, consistent with the present invention.

FIG. 3A is a perspective view of two exemplary fully assembled flap cartridge assemblies 208, previously shown as exploded components in FIGS. 2A and 2B. The rotary position of the shafts 210 (and therefore the position of the flap valves 230) are synchronized by a linkage member 212 rotationally linking the two shafts 210 so as to rotate in unison.

Figure 3B:
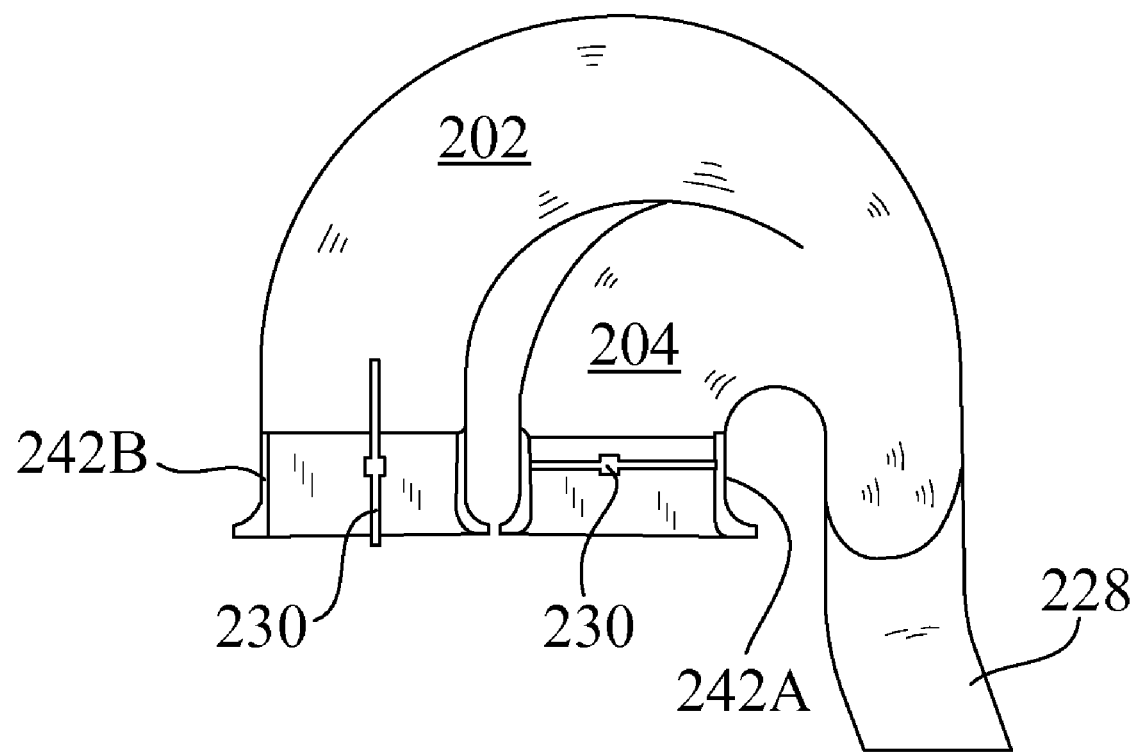
FIG. 3B is a side view with a partial cutaway illustrating an exemplary two tract intake runner for connection between a flap cartridge assembly and an engine cylinder head intake valve connection, consistent with the present invention.

FIG. 3B is a side view with a partial cutaway illustrating an exemplary two tract intake runner 228 (shown schematically as 128A-D in FIG. 1) for air flow connection between an outlet of flap valve housing 242 of flap cartridge assemblies 208 and the cylinder head intake valve of an engine 116 (see FIG. 1). In particular, FIG. 3B illustrates a two tract intake runner 228 having its short tract 204 connected to an outlet of the flap valve housing 242A (see also FIG. 2A) and its long tract connected to an outlet of the flap valve housing 242B (see also FIG. 2A). As is depicted in FIG. 3A, the flap valve 230B is depicted in the closed position (closing off long tract 202) and the flap valve 230A is depicted in the open position (open to short tract 204). As discussed earlier with FIG. 1, either the long tract 202 or the short tract 204 is in an open state as the flap valves are positioned 90 degrees out of phase with each other on the shafts 210. In an exemplary embodiment, the short tract 204 and long tract 202 are ultrasonic welded to outlets of flap valve housings 242A and 242B respectively. The tracts may be secured to the flap valve housings using any other means as would be known to one skilled in the art, including hot plate welding, laser welding, ultrasonic welding, adhesives and other means. The remaining two tract intake runners would be positioned in alternating left-right fashion and secured to their respective flap valve housings as described above and as illustrated schematically in FIG. 1.

While the best modes for carrying out the invention have been described in detail, those familiar with the art to which this invention relates will recognize various alternative designs and embodiments for practicing the invention within the scope of the appended claims.

The invention claimed is:

1. An active intake manifold system comprising:
at least one flap cartridge assembly having:
  a unitary cartridge housing including
    at least one flap valve housing having an airflow aperture therethrough connecting an inlet and outlet; and
    a flap valve rotatable in said aperture of said flap valve housing including at least one mounting ear having an aperture, said mounting ears secured to said flap valve, said flap valve rotatable between an open state and a closed state, wherein when in said closed state said flap valve substantially prevents airflow through said flap valve housing aperture, wherein said flap valves share a common axis of rotation;

a shaft extending through said mounting ear apertures, said mounting ears rotationally locking said flap valves to change state in unison; and a plurality of air intake runners, each having a main runner portion splitting into a plurality of tracts of differing lengths, each tract tuned to a different predetermined engine speed and having a length and volume selected to optimize engine performance at said predetermined speed, each tract in air flow communication with a different flap valve housing outlet;

wherein for said plurality of tracts of any one intake runner only one flap valve at a time is in said open state.

2. The active intake manifold of claim 1, wherein said inlets of said flap valve housings are secured to and in air flow communication with an air intake duct.

3. The active intake manifold of claim 1, wherein said flap valve housings of each unitary cartridge housing are arranged linearly side by side in alignment with said common axis of rotation.

4. The active intake manifold of claim 1, wherein when a portion of said flap valves on said shaft are in said closed state, a different portion of said flap valves are in said open state.

5. The active intake manifold of claim 1, wherein
each tract of said intake runner is connected to a different flap cartridge assembly;
wherein flap valves in said flap cartridge assemblies are synchronized such that for any given intake runner only one tract has a flap valve in said open state at a time.

6. The active intake manifold of claim 5, wherein said synchronization between flap cartridge assemblies is provided by a mechanical linkage connecting said shafts of said flap cartridge assemblies such that said shafts rotate in unison.

7. The active intake manifold of claim 1, wherein said plurality of tracts comprise a long tract and a short tract.

8. The active intake manifold of claim 1, further comprising:
at least one bearing cartridge sized and configured to be inserted into bearing receptacles provided in said unitary cartridge housing, said bearing cartridge including a bearing aperture sized and configured to permit said shaft to supportively pass through and rotate in said bearing, thereby rotatably supporting said flap valves.

9. The active intake manifold of claim 8, wherein said bearing cartridge comprises an elastomeric material, said elastomeric material resiliently contacting said bearing receptacle preventing air leakage around said bearing cartridge.

10. The active intake manifold of claim 9, wherein said bearing receptacles are arch-shaped and said bearing cartridges are shaped and configured to be received into said arch-shaped bearing receptacles.

11. An active intake manifold system comprising:
two flap cartridge assemblies, each having:
a unitary cartridge housing including
a plurality of flap valve housings in a side by side linear arrangement, each having an airflow aperture therethrough connecting an inlet and outlet of each flap valve housing;
a flap valve rotatable in said aperture of said flap valve housing including at least one mounting ear having an aperture, said mounting ears secured to said flap valve, said flap valve rotatable between an open state and a closed state, wherein when in said closed state said flap valve substantially prevents airflow through said flap valve housing aperture, wherein said flap valves share a common axis of rotation;
a shaft extending through said mounting ear apertures, said shaft ears rotationally locking said flap valves to change state in unison; and
a plurality of bearing cartridges sized and configured to be inserted into bearing receptacles in said unitary cartridge housing, each bearing cartridge including a bearing aperture sized and configured to permit said shaft to supportively pass through and rotate in said bearing, rotatably supporting said flap valves;
wherein each bearing cartridge comprises an elastomeric material, said elastomeric material resiliently contacting said bearing receptacle preventing air leakage around said bearing cartridge; and
wherein said bearing receptacles are arch-shaped and said bearing cartridges are shaped and configured to be received into said arch-shaped bearing receptacles;
a plurality of air intake runners having a main runner portion splitting into a short tract and a long tract, each tract tuned to a different predetermined engine speed and having a length and volume selected to optimize engine performance at said predetermined speed; and
a mechanical linkage connecting said shafts of said flap cartridge assemblies such that said shafts rotate in unison;
wherein for each intake runner, each tract is in air flow communication with a flap valve housing outlet on a different one of said flap cartridge assemblies;
wherein said inlet of said flap valve housings are secured in air flow communication to an air intake duct;
wherein said side by side linear arrangement is aligned with said common axis of rotation; and
wherein for each of said flap cartridge assemblies, when a portion of said flap valves are in said closed state, a different portion of said flap valves are in said open state.

12. The active intake manifold system of claim 11, wherein each of said tracts are ultrasonic welded to a different one of said flap valve housing outlets to provide said air flow communication.

13. The active intake manifold system of claim 11, wherein said flap valves of each flap valve cartridge assembly are configured to have alternating open-closed states along said common axis of rotation.

* * * * *